(12) United States Patent
Mueller

(10) Patent No.: US 7,251,902 B1
(45) Date of Patent: Aug. 7, 2007

(54) PIPE GUIDE

(75) Inventor: Frederick Harold Mueller, San Angelo, TX (US)

(73) Assignee: Mueller Metals, Inc., San Angelo, TX (US)

( * ) Notice: Subject to any disclaimer, the term of this patent is extended or adjusted under 35 U.S.C. 154(b) by 0 days.

(21) Appl. No.: 11/345,570

(22) Filed: Feb. 1, 2006

(51) Int. Cl.
*B23K 7/10* (2006.01)

(52) U.S. Cl. .......................................... 33/562; 33/529

(58) Field of Classification Search ...................... None
See application file for complete search history.

(56) References Cited

U.S. PATENT DOCUMENTS

| | | | | |
|---|---|---|---|---|
| 724,185 | A | * | 3/1903 | Hughes ........................ 33/529 |
| 2,216,302 | A | * | 10/1940 | Svoboda ...................... 33/529 |
| 3,209,459 | A | * | 10/1965 | Fish, Jr. ....................... 33/562 |
| 4,470,197 | A | * | 9/1984 | Pagalies ...................... 33/562 |
| 4,618,378 | A | * | 10/1986 | Huckaby .................... 148/201 |
| 4,653,195 | A | * | 3/1987 | Esparza ....................... 33/529 |
| D319,794 | S | * | 9/1991 | Elkins ........................ D10/68 |
| 5,450,677 | A | * | 9/1995 | Casey .......................... 33/529 |
| 6,209,215 | B1 | * | 4/2001 | Helms ......................... 33/529 |
| 6,560,887 | B2 | * | 5/2003 | Byrnes ........................ 33/534 |
| 2006/0037458 | A1 | * | 2/2006 | Guinness ..................... 84/100 |

* cited by examiner

*Primary Examiner*—Yaritza Guadalupe-McCall
(74) *Attorney, Agent, or Firm*—Gardere Wynne Sewell LLP

(57) ABSTRACT

A pipe guide includes a pipe receiving body comprising two sections. The two sections are joined by a hinge to allow the pipe-receiving body to be opened and closed about a pipe. The pipe-receiving body circumferentially surrounds a pipe in a closed position. The pipe receiving body includes one or more marking slots. The marking slots allow the pipe inside the pipe-receiving body to be marked in a predetermined pattern. The pipe guide includes a hinged disposed longitudinally on the exterior of the pipe receiving body. A device disposed inside the hinge retains the pipe-receiving body in a closed position around the pipe. The pipe receiving body is cylindrical having first and second ends. The first end can be substantially perpendicular to the axis of the pipe receiving body and configured to allow the pipe to be marked at a 90 degree angle. The first end can be at any other angle (e.g., 45 degree, 22 ½ degree) or can have a predetermined shape or a pattern. The second end can have a predetermined shape (e.g., saddle shape) or the second end can be at a predetermined angle (e.g., 90 degree, 45 degree, 22 ½ degree).

18 Claims, 9 Drawing Sheets

FRONT VIEW

FLAT PLANE VIEW

TOP VIEW

LEFT PIECE REAR VIEW

RIGHT PIECE REAR VIEW

LEFT PIECE REAR VIEW

RIGHT PIECE REAR VIEW

PIPE GUIDE

BACKGROUND OF THE INVENTION

Pipes are often cut in different shapes and patterns for various purposes such as constructing a fence, a gate or other products made from a pipe or a tube. A pipe can be cut perpendicular to its axis to construct a fence having a horizontal or a float top. A pipe can be cut at an angle to construct a fence, wherein each pipe has an angular end. Also, a pipe can be cut in a desired shape such as a saddle shape, wherein each pipe post in the fence has a saddle-shaped end.

A pipe guide is generally used to mark a pipe prior to the pipe being cut. A pipe guide is placed over the pipe to be marked and a marking chalk or pen is used to mark the pipe. The pipe guide is thereafter removed from the pipe, and the pipe is cut along the mark.

Existing pipe guides are typically cylindrical in shape having two ends. One end of the pipe guide may be perpendicular or may be at a particular angle with respect to the axis of the pipe guide. A perpendicular end of the pipe guide allows a pipe to be marked at a 90 degree angle. If the end of the pipe guide is at a particular angle, the pipe can be marked at that angle. The other end of the pipe guide can have a desired shape such as a saddle shape to allow the pipe to be marked in a saddle shape. Thus, existing pipe guides allow the pipes to be marked in two different shapes or angles. For example, one end of a pipe guide may allow the pipes to be marked in a saddle shaped pattern while the other end may allow the pipes to be marked at a 90 degree angle. Thus, if the pipes are required to be cut at different shapes and angles, a single pipe guide is insufficient and consequently several pipe guides each having different shapes and angles are needed to mark the pipes.

Furthermore, the existing pipe guides do not provide a mechanism to retain the pipe guide in place over the pipe while the user can have free use of both hands. The existing pipe guides require the user to use one hand to hold the pipe guide in place over the pipe and use the other hand to mark the pipe.

Thus, there is a need for a pipe guide that allows a pipe to be marked at different angles and patterns. There is also a need for a pipe guide that provides a mechanism to retain the pipe guide in place over the pipe, thereby allowing a user to use both hands to mark the pipe.

BRIEF SUMMARY OF THE INVENTION

A pipe guide includes a pipe receiving body comprising two sections. The two sections are joined by a hinge to allow the pipe-receiving body to be opened and closed about a pipe. The pipe-receiving body circumferentially surrounds the pipe in a closed position.

The pipe receiving body includes one or more marking slots. The marking slots allow the pipe inside the pipe-receiving body to be marked in a predetermined pattern. The pipe guide includes a hinge disposed longitudinally on the exterior of the pipe receiving body. A device disposed inside the hinge retains the pipe-receiving body in a closed position around the pipe.

The pipe receiving body is cylindrical having first and second ends. The first end can be substantially perpendicular to the axis of the pipe receiving body and configured to allow the pipe to be marked at a 90 degree angle. The first end can be at any other desired angle (e.g., 45 degrees, 22 ½ degrees) or can have any predetermined shape or pattern. The second end can have a predetermined shape (e.g., saddle shape) or the second end can be at a predetermined angle (e.g., 90 degrees, 45 degrees, 22 ½ degrees).

The marking slots are formed at predetermined angles (e.g., 45 degrees, 22 ½ degrees). The marking slots are configured to allow the pipe to be marked at the predetermined angles. The marking slots can also have any predetermined shape or pattern allowing the pipe to marked in a predetermined shape or pattern.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
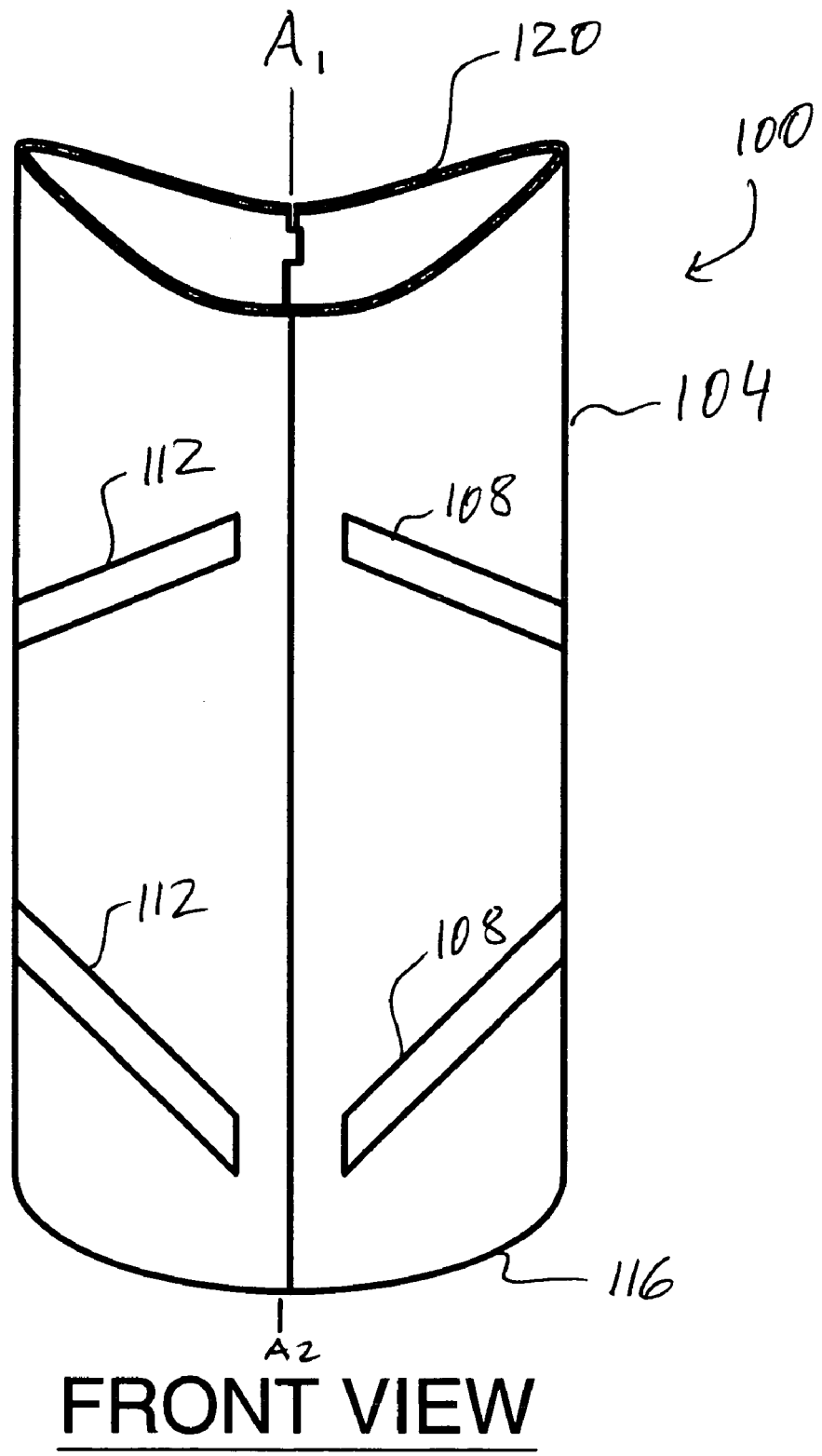
FIG. 1 illustrates a front view of one embodiment of the pipe guide.

FIG. 1 illustrates a front view of one embodiment of the pipe guide 100. The pipe guide 100 includes a pipe receiving body 104. The pipe receiving body 104 has a cylindrical shape and is configured to receive a pipe (not shown in FIG. 1). The pipe receiving body 104 includes two sections joined by a hinge (not shown in FIG. 1) to allow the pipe receiving body 104 to be opened and closed about the pipe. The pipe receiving body 104 circumferentially surrounds the pipe in closed position.

The pipe receiving body 104 has a first end 116 and a second end 120. In one embodiment, the first end 116 is substantially perpendicular to the longitudinal axis (indicated by the line A1-A2) of the pipe receiving body 104. The first end 116 allows a pipe to be marked at a 90 degree angle using, for example, a pen or a marker. Once the pipe is marked, the pipe guide 100 can be removed from the pipe and the pipe can be cut along the mark. The first end 116 can be at any desired angle with respect to the longitudinal axis A1-A2.

The pipe receiving body 104 has a second end 120. In one embodiment, the second end 120 has a saddle shape as shown in FIG. 1. The saddle shaped second end allows the pipe to be marked in a saddle pattern. The pipe is then cut along the mark to create a saddle shape.

The first end 116 can be used to mark and cut pipes at a 90 degree angle and thus create a fence having a 90 degree cut at the top. The second end 120 can be used to mark and cut pipes in a saddle shape and thus create a fence having a saddle shape at the top of the pipe posts. The first and second ends can have any desired shapes or patterns or can have any desired angles.

A plurality of marking slots 108, 112 are created on the pipe receiving body 104. The marking slots 108, 112 can be created by stamping or punching out predetermined sections from the pipe receiving body 104. The marking slots 108, 112 allow the pipe to be marked at predetermined angles. In one embodiment, the marking slots are created at a 45 degree angle and a 22 ½ degree angle. Thus the pipe can be marked and cut at a 45 degree angle or at a 22 ½ degree angle. The marking slots 108 can have any other desired angles or any desired shapes or patterns.

Figure 2:
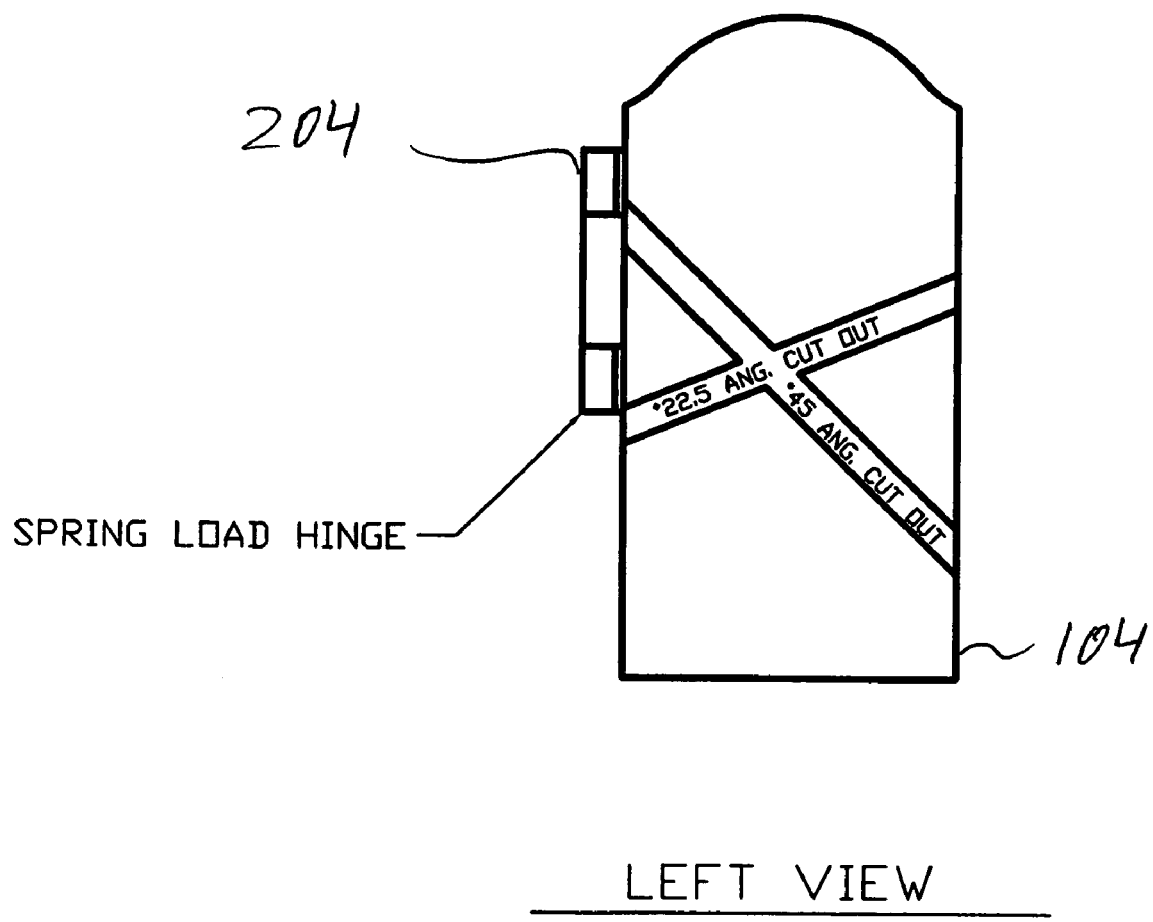
FIG. 2 shows a left side view of one embodiment of the pipe guide.

FIG. 2 shows a left side view of one embodiment of the pipe guide 100. A hinge 204 is disposed longitudinally on the exterior of the pipe receiving body 104. The hinge 204 allows the pipe-receiving body 104 to be opened and closed about a pipe (not shown in FIG. 2). The hinge 204 includes a hinge pin (not shown in FIG. 2) to allow the two portions of the pipe receiving body 104 to be joined and to be opened and closed about the hinge 204.

In one embodiment, a spring (not shown in FIG. 2) is disposed inside the hinge 204. The spring allows the pipe-receiving body 104 to remain in a closed position around the pipe.

Figure 3:
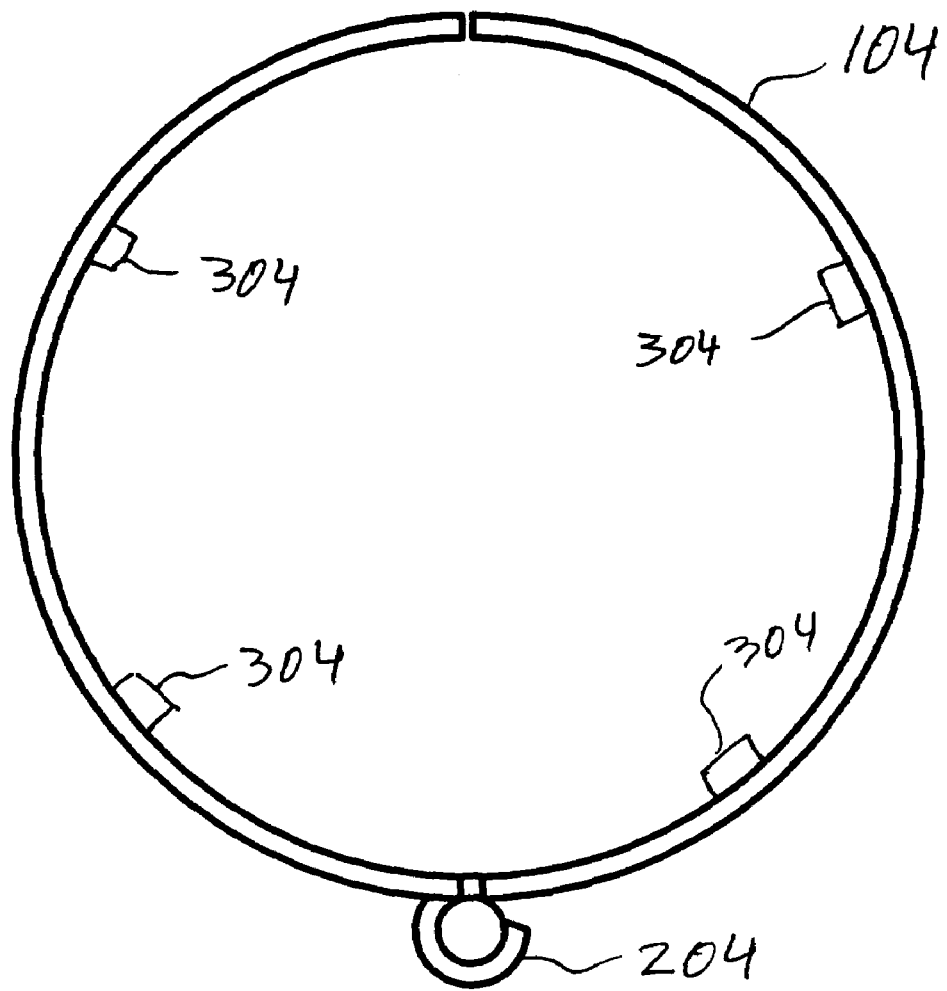
FIG. 3 is a top view of one embodiment of the pipe guide.

FIG. 3 is a top view of the pipe guide 100. FIG. 3 shows the pipe receiving body 104 and the hinge 204. In one embodiment, a plurality of pads 304 are disposed on the inner wall of the pipe receiving body 104. The pads 304 are made of rubber or other selected material to allow the pipe guide 100 to firmly grip the pipe in a closed position. In another embodiment, a layer of rubber or other suitable material can be disposed on the inner wall to allow the pipe guide 100 to firmly adhere to the pipe in a closed position. The pads 304 or the layer of suitable material prevents the pipe guide from sliding on the pipe when the pipe guide is not held in place by a user.

The pipe guide 100 can having different diameters depending on the size of the pipe to be marked. For example, the pipe guide 100 can have diameters of 1 ⅞ inches, 2 ⅜ inches, 2 ⅞ inches, 3 ½ inches, or 4 ½ inches.

In one embodiment, the two sections of the pipe receiving body 104 are made from a sheet of 16 gauge metal. The slots 108 and the hinge 204 are created on the sheet of metal and the two sections are joined by the hinge 204. The hinge 204 incorporates a spring or a similar mechanism that will snap back shut the two sections when opened around a pipe. The spring allows the pipe guide 100 to remain attached to the pipe, allowing a user to have both hands free while marking the pipe.

In one embodiment, the hinge 204 is a conventional hinge having a rod inside the hinge. In one embodiment, the pipe guide 100 can be made of a plastic-type material. Other suitable materials can be used to make the pipe guide 100.

In one embodiment, the slots are configured to allow a marking chalk or a marking pencil to be used inside the opening to reach and mark on the pipe. The second end 120, which has a saddle shape, acts as a saddle guide allowing the pipe to be marked in a saddle shape. The first end 116 allows the pipe to be marked at a 90 degree angle.

Figure 4:
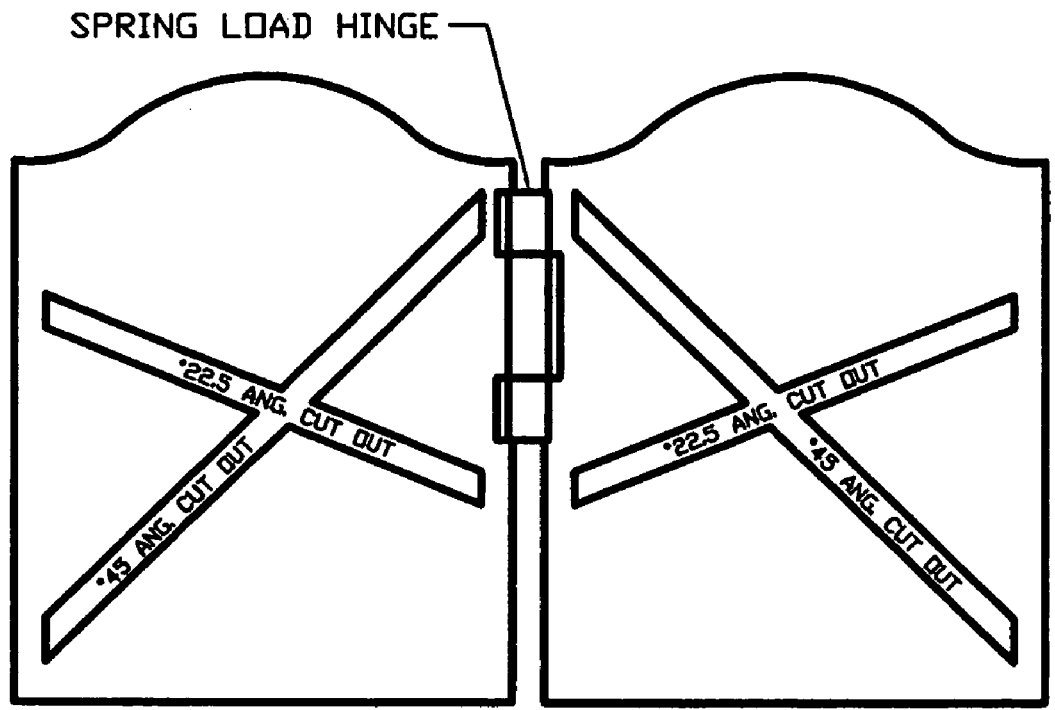
FIG. 4 is a flat plane view of one embodiment of the pipe guide.
Figure 5:
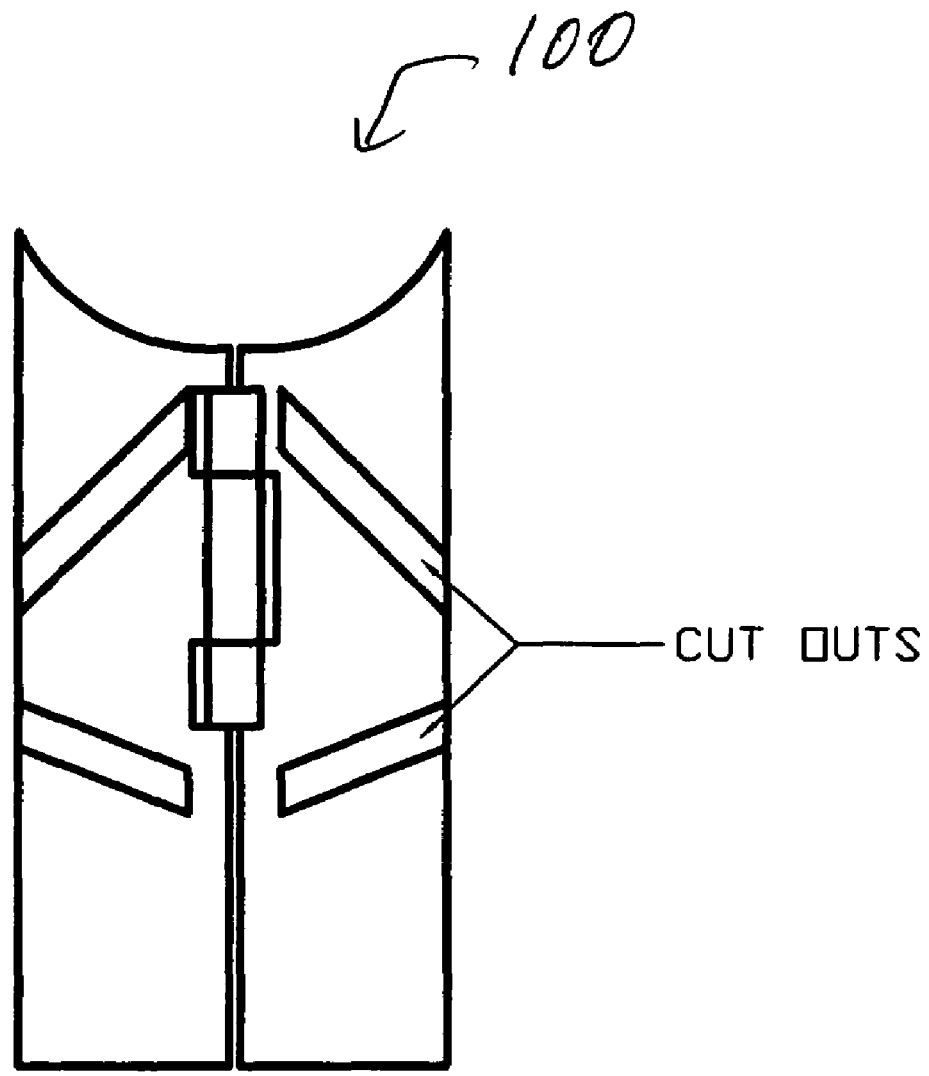
FIG. 5 is a rear view of one embodiment of the pipe guide.
Figure 6:
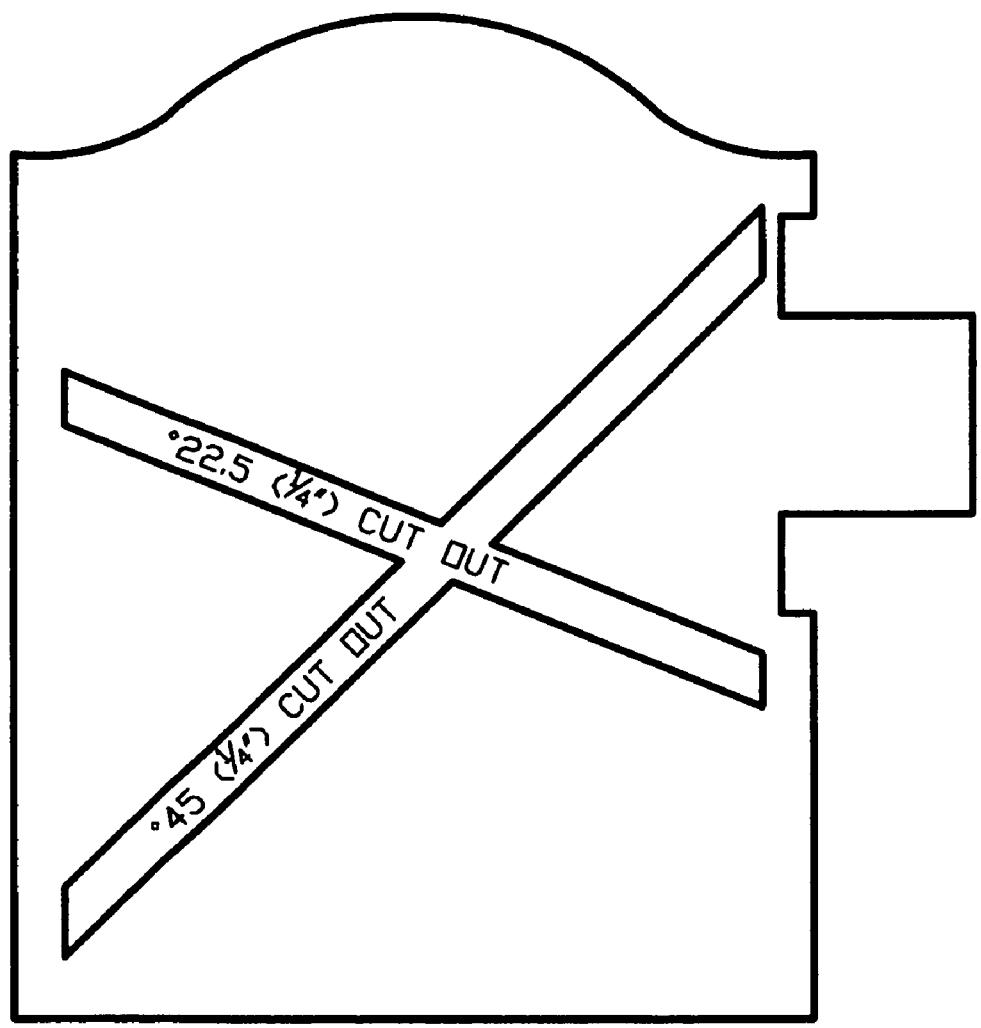
FIG. 6 is a left rear view of one embodiment of the pipe guide.
Figure 7:
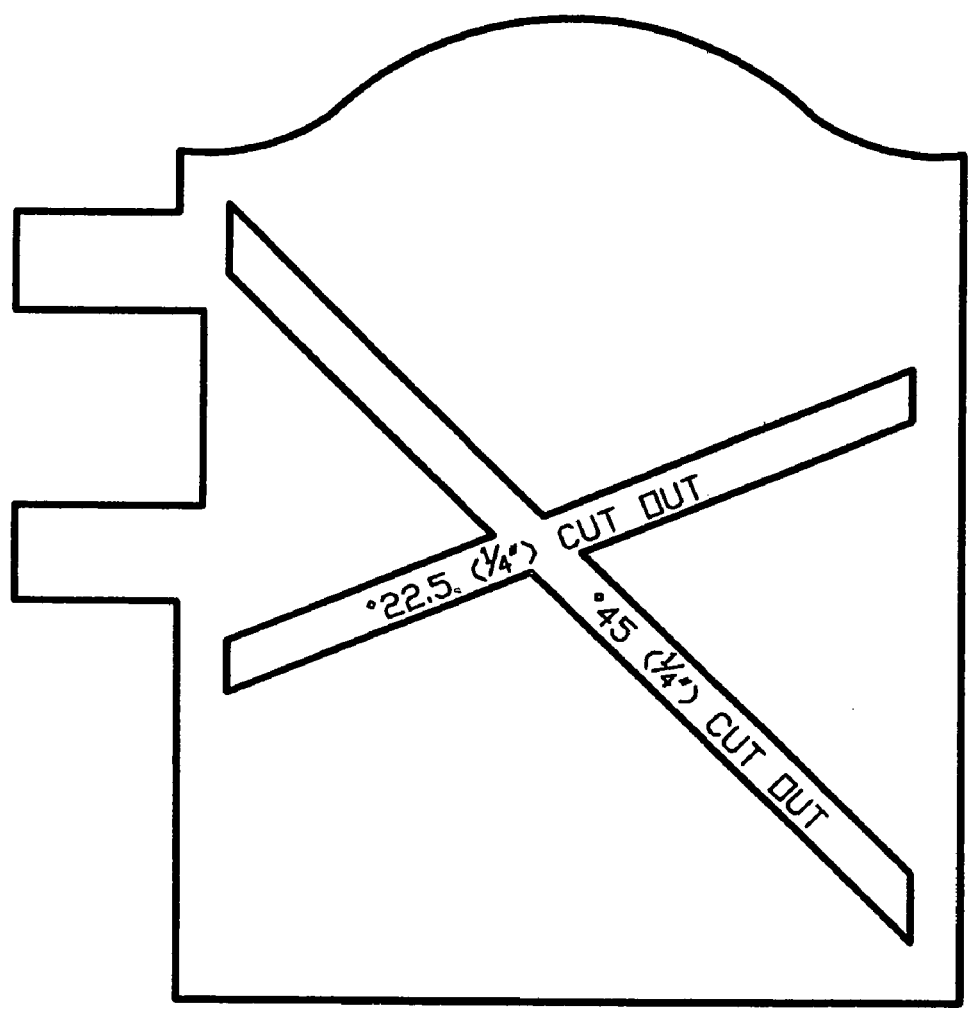
FIG. 7 is a right rear view of one embodiment of the pipe guide.
Figure 8:
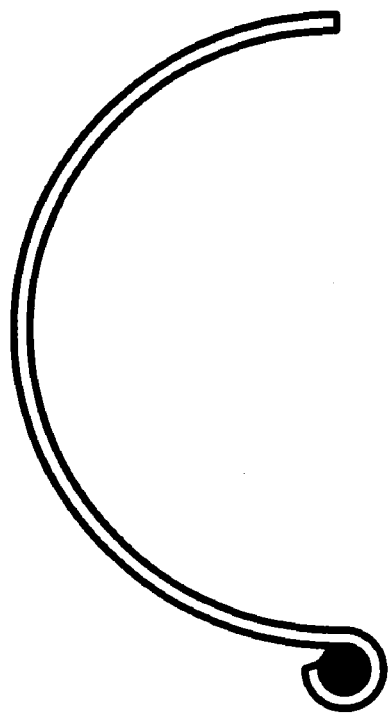
FIG. 8 is a left piece top view of one embodiment of the pipe guide.
Figure 9:
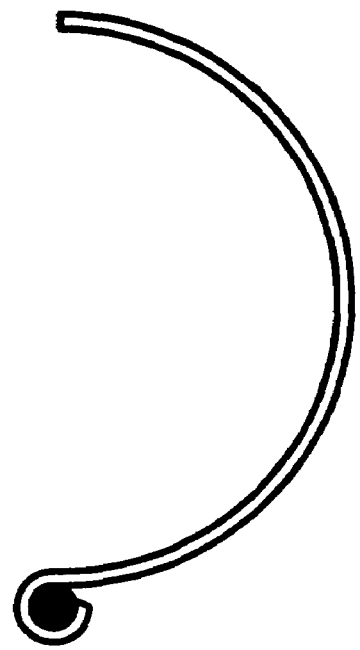
FIG. 9 is a right piece top view of one embodiment of the pipe guide.

FIG. 4 is a flat plane view of one embodiment of the pipe guide 100. FIG. 5 is a rear view of one embodiment of the pipe guide 100. FIG. 6 is a left rear view of one embodiment of the pipe guide. FIG. 7 is a right rear view of one embodiment of the pipe guide. FIG. 8 is a left piece top view of one embodiment of the pipe guide. FIG. 9 is a right piece top view of one embodiment of the pipe guide.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present inveiton as defined by the appended claims.

I claim:

1. A pipe guide for marking a pipe, consisting of:
    a pipe receiving body,
    the pipe receiving body comprising two portions joined by a hinge to allow the pipe receiving body to be opened and closed about a pipe, the pipe-receiving body circumferentially surrounding a pipe in closed position;
    a plurality of pads disposed on the inner wall of the pipe receiving body and configured to firmly grip the pipe in a closed position to prevent the pipe guide from sliding on the pipe when the pipe guide is not held by a user;
    a spring disposed on the hinge to retain the pipe receiving body in a closed position allowing the user to have both hands free while marking the pipe;
    one or more marking slots formed on the pipe-receiving body and configured to allow the pipe inside the pipe-receiving body to be marked in a predetermined pattern,
    wherein the marking slots are formed by creating openings through the pipe-receiving body.

2. The pipe guide of claim 1, wherein the hinge is disposed longitudinally on the exterior of the pipe receiving body.

3. The pipe guide of claim 1, further comprising device disposed inside the hinge and configured to retain the pipe-receiving body in a closed position around the pipe.

4. The pipe guide of claim 1, wherein the pipe receiving body is cylindrical having first and second ends.

5. The pipe guide of claim 4, wherein the first end is substantially perpendicular to the axis of the pipe receiving body and configured to allow the pipe to be marked at a 90 degree angle.

6. The pipe guide of claim 4, wherein the second end has a predetermined shape.

7. The pipe guide of claim 4, wherein the second end has a substantially saddle-shape and configured to allow the pipe to be marked in a saddle pattern.

8. The pipe guide of claim 1, wherein the marking slots are formed at a predetermined angle.

9. The pipe guide of claim 1, wherein the marking slot is configured to allow the pipe to be marked at a 45 degree angle.

10. The pipe guide of claim 1, wherein the marking slot is configured to allow the pipe to be marked at a 22 ½ degree angle.

11. The pipe guide of claim 1, wherein the inner wall of the pipe receiving body is configured to circumferentially wrap around the pipe in a closed position.

12. The pipe guide of claim 1, wherein the inner wall of the pipe receiving body circumferentially surrounds an axis and defining an inner cavity configured to receive the pipe.

13. The pipe guide of claim 1, further comprising a material disposed on the inner wall of the pipe receiving body and configured to firmly grip the pipe in a closed position.

14. The pipe guide of claim 1, wherein the pipe receiving body has a selected diameter.

15. A cylindrical pipe guide for marking a pipe, consisting of:
- a pipe receiving body;
- a pipe receiving body comprising two portions joined by a hinge to allow the pipe-receiving body to be opened and closed about a pipe, the pipe-receiving body circumferentially surrounding a pipe in closed position, the hinge being disposed longitudinally on the pipe-receiving body;
- a plurality of pads disposed on the inner wall of the pipe receiving body and configured to firmly grip the pipe in a closed position to prevent the pipe guide from sliding on the pipe when the pipe guide is not held by a user;
- a spring disposed on the hinge to retain the pipe receiving body in a closed position allowing the user to have both hands free while marking the pipe;
- one or more marking slots formed on the pipe-receiving body and configured to allow the pipe inside the pipe-receiving body to be marked in a predetermined pattern, wherein the marking slots are formed by creating openings through the pipe-receiving body.

16. The pipe guide of claim 15, wherein the marking slots are formed at a predetermined angle.

17. A cylindrical pipe guide for marking a pipe, consisting of:
- a pipe receiving body,
- the pipe receiving body comprising two portions joined by a hinge to allow the pipe-receiving body to be opened and closed about a pipe, the pipe-receiving body circumferentially surrounding a pipe in a closed position, the hinge being disposed longitudinally on the pipe-receiving body,
- a plurality of pads disposed on the inner wall of the pipe receiving body and configured to firmly grip the pipe in a closed position to prevent the pipe guide from sliding on the pipe when the pipe guide is not held by a user;
- a spring disposed on the hinge to retain the pipe receiving body in a closed position allowing the user to have both hands free while marking the pipe;
- the first end of the pipe receiving body being substantially perpendicular to the axis of the pipe receiving body and configured to allow the pipe to be marked at a 90 degree angle, the second end of the pipe receiving body having a predetermined shape;
- one or more marking slots formed on the pipe-receiving body and configured to allow the pipe inside the pipe-receiving body to be marked in a predetermined pattern, wherein the marking slots are formed by creating openings through the pipe-receiving body; and
- a spring disposed inside the hinge and configured to retain the pipe-receiving body in a closed position around the pipe.

18. The pipe guide of claim 17, wherein the marking slots are formed at a predetermined angle.

* * * * *